(12) United States Patent
Kostyushko et al.

(10) Patent No.: US 11,074,114 B1
(45) Date of Patent: Jul. 27, 2021

(54) SYSTEM AND METHOD FOR EXECUTING APPLICATIONS IN A NON-NATIVE ENVIRONMENT

(71) Applicant: Virtuozzo International GmbH, Schaffhausen (CH)

(72) Inventors: Alexey Kostyushko, Moscow (RU); Alexey Kobets, Seattle, WA (US)

(73) Assignee: VIRTUOZZO INTERNATIONAL GMBH, Schaffhausen (CH)

( * ) Notice: Subject to any disclaimer, the term of this patent is extended or adjusted under 35 U.S.C. 154(b) by 313 days.

(21) Appl. No.: 15/858,653

(22) Filed: Dec. 29, 2017

(51) Int. Cl.
*G06F 9/54* (2006.01)
*G06F 9/46* (2006.01)
*G06F 9/448* (2018.01)

(52) U.S. Cl.
CPC ............ *G06F 9/541* (2013.01); *G06F 9/4484* (2018.02); *G06F 9/468* (2013.01)

(58) Field of Classification Search
CPC ......... G06F 9/4484; G06F 9/468; G06F 9/541
See application file for complete search history.

(56) References Cited

U.S. PATENT DOCUMENTS

| 7,752,030 | B2 * | 7/2010 | Weissmann | ......... | G06F 9/45533 |
| | | | | | 703/26 |
| 2005/0102129 | A1 * | 5/2005 | Bond | .................. | G06F 9/45537 |
| | | | | | 703/26 |
| 2009/0113458 | A1 * | 4/2009 | Finger | ................. | G06F 9/45533 |
| | | | | | 719/327 |
| 2013/0097356 | A1 * | 4/2013 | Dang | ..................... | G06F 21/57 |
| | | | | | 711/6 |
| 2015/0088982 | A1 * | 3/2015 | Johnson | .............. | H04L 67/1004 |
| | | | | | 709/203 |
| 2015/0281336 | A1 * | 10/2015 | Beale | .................. | G06F 11/1469 |
| | | | | | 709/201 |
| 2016/0344745 | A1 * | 11/2016 | Johnson | .................. | H04L 63/08 |
| 2017/0249261 | A1 * | 8/2017 | Durham | .............. | G06F 12/1027 |

* cited by examiner

*Primary Examiner* — Doon Y Chow
*Assistant Examiner* — Carina Yun
(74) *Attorney, Agent, or Firm* — Arent Fox LLP; Michael Fainberg

(57) ABSTRACT

The described system provides one or more processors and memory, coupled to the one or more processors, storing thereon a first OS kernel that receives a system call to access a second OS kernel function from a subsystem of the second OS retransmits the system call to one or more drivers of the first OS, support the subsystem. The system further comprises a subsystem of the second OS, comprising one or more user space components executing natively in a non-privileged mode of the one or more processors, a set of drivers associated with the second OS, the set of support components, and the one or more drivers of the first OS. The one or more drivers of the first OS receive the system call originating from the subsystem, wherein the system call is retransmitted by the first OS kernel and process the system call.

20 Claims, 13 Drawing Sheets

SYSTEM AND METHOD FOR EXECUTING APPLICATIONS IN A NON-NATIVE ENVIRONMENT

FIELD OF TECHNOLOGY

The present disclosure relates generally to the field of application and OS kernel interaction and, more specifically, to systems and methods for executing applications in a non-native environment.

BACKGROUND

In the current state of the art, it is possible to execute applications, for example Windows® applications, in non-native operating systems (OS), for example Linux®, OSX® and the like. However, the methods to accomplish such execution are technically limited. In one example, an implementation known as WINE® is used in order to execute one or more Windows applications on Linux®. WINE is a rewritten part of the Windows operating system instance which is executed on Linux as a standalone executable. Invariably such implementations require re-implementing large portions of the Windows kernel in addition to re-implementing third party drivers and Windows services, e.g., layer 109 as shown in FIG. 1A, leading to general operating system instability, un-maintainability and a high probability of latent defects. Additionally, such implementations tend to limit the types of applications that are executable on the platform and often exclude complex applications that require kernel-level access. Alternative implementations are often operating system incompatible. For example, ReactOS® re-implements the entire Windows Application layer 117 as shown in FIG. 1A, and is not compatible with LINUX. These alternatives also reinvent the wheel by re-implementing the majority of the operating system kernel, copying the structure of the Windows OS and rewriting and re-implementing operating system services. Similarly, the alternatives suffer from instability and complexity leading to the proliferation of defects.

Other vendors have attempted to solve this problem in different ways, including creating an environment for running LINUX processes in WINDOWS. This solution has been implemented as a monolithic LINUX kernel which is inflexible—when new drivers need to be added, the kernel requires re-compilation in its entirety. Hardware virtualization (such as hypervisors) is an option, which virtualizes an entire hardware environment and contains para-virtualized drivers for virtual devices, emulating layer 103 as shown in FIG. 1A. Hardware virtualization also provides CPU virtualization so it must perform address translation, duplicating memory work and slowing down operation of all functions. Virtual machine entry and exit (vmentry, vmexit) operations also are significantly time consuming operations which slow hardware virtualization options. Finally, container virtualization is another option where individual kernels share the same kernel which makes them unable to execute an operating system with a kernel different from the host kernel.

Therefore, in order to address some of these concerns, there is a need in the art for improved system and methods for executing non-native applications in an OS.

SUMMARY

A system and method is disclosed herein for executing, on a first operating system (OS), components native to a second operating system (OS). According to one aspect, the system comprises one or more processors and memory, coupled to the one or more processors, storing thereon a first OS kernel that receives a system call to access a second OS kernel function from a subsystem of the second OS retransmits the system call to one or more drivers of the first OS, supporting the subsystem. The system further comprises a subsystem of the second OS, comprising one or more user space components executing natively in a non-privileged mode of the one or more processors, a set of drivers associated with the second OS, the set of support components, and the one or more drivers of the first OS. The one or more drivers of the first OS receive the system call originating from the subsystem, wherein the system call is retransmitted by the first OS kernel and process the system call.

Further aspects of the system include wherein the set of drivers associated with the second OS kernel and the set of support components execute in a memory range that is protected from the one or more user space components.

Further aspects of the system include wherein the set of drivers associated with the second OS execute in the non-privileged mode and the supporting components execute in the non-privileged mode.

Further aspects of the system include wherein the set of drivers associated with the second OS call one or more second OS API functions from the one or more supporting components.

Further aspects of the system include wherein protection of the memory range from the one or more user space components further comprises that the memory range is inaccessible in a process, when the process is executing any of the one or more user space components.

Further aspects of the system include wherein a set of drivers associated with the second OS are executing in the non-privileged mode by modifying a portion of the set of drivers, and wherein the set of drivers send system calls to kernel mode components.

Further aspects of the system include wherein the one or more user space components are applications native to the second OS.

Further aspects of the system include wherein the gap memory is the protected memory range and wherein the first OS kernel assigns the gap memory to be accessible in non-privileged mode by modifying a memory map of the first OS, wherein the gap memory is a range of memory addresses that were previously accessible only in privileged mode.

Further aspects of the system include wherein the gap memory comprises several conjoint or non-conjoint memory address ranges.

Further aspects of the system include wherein the one or more drivers of the first OS, supporting the subsystem, performs at least one of the following actions, depending on the received system call (a) calling one of the components of the second OS subsystem, which are in a privileged mode of the one or more processors or (b) translating the system call to a call to an API of the first OS kernel; and calling the first OS kernel.

Further aspects of the system include wherein the one or more user space components of the second OS are executed in a first process, and the set of drivers associated with the second OS, the set of drivers associated with the second OS and the set of support components are executed in a second process, and wherein a context switch between the one or more user space components of the second OS and the set of drivers and the set of support components associated with the second OS comprises switching between the first process and the second process.

Yet other aspects of the disclosure provide a method for executing, on a first OS, components native to a second OS, the method comprising modifying a memory map of a kernel, executing on a hardware processor, of the first OS by: reserving a first portion of kernel space memory for a privileged driver of the second OS, reserving a second portion of kernel space memory for one or more drivers of the first OS, reserving a first portion of user space memory for set of drivers associated with the second OS, reserving a second portion of user space memory for a set of support components that provide functionality of one or more exports of the second OS kernel executing in the non-privileged mode of the one or more processors, and executing one or more user space components that are native to the second OS in the user space memory of the kernel of the first OS.

Yet some other aspects of the disclosure provide for a computer-readable medium storing thereon instructions for executing the various methods and implementing the various systems described herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for executing applications in non-native environments. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Exemplary aspects of the present disclosure provide a method and system for executing applications in a non-native environment. While FIGS. 2-11 show the implementation of a computer system where WINDOWS applications run on a modified LINUX kernel, the disclosure is not limited to WINDOWS applications running on LINUX kernels, but may be applied generally to any first and second OS, where applications native to the first OS are able to execute on the second OS.

Figure 1A:
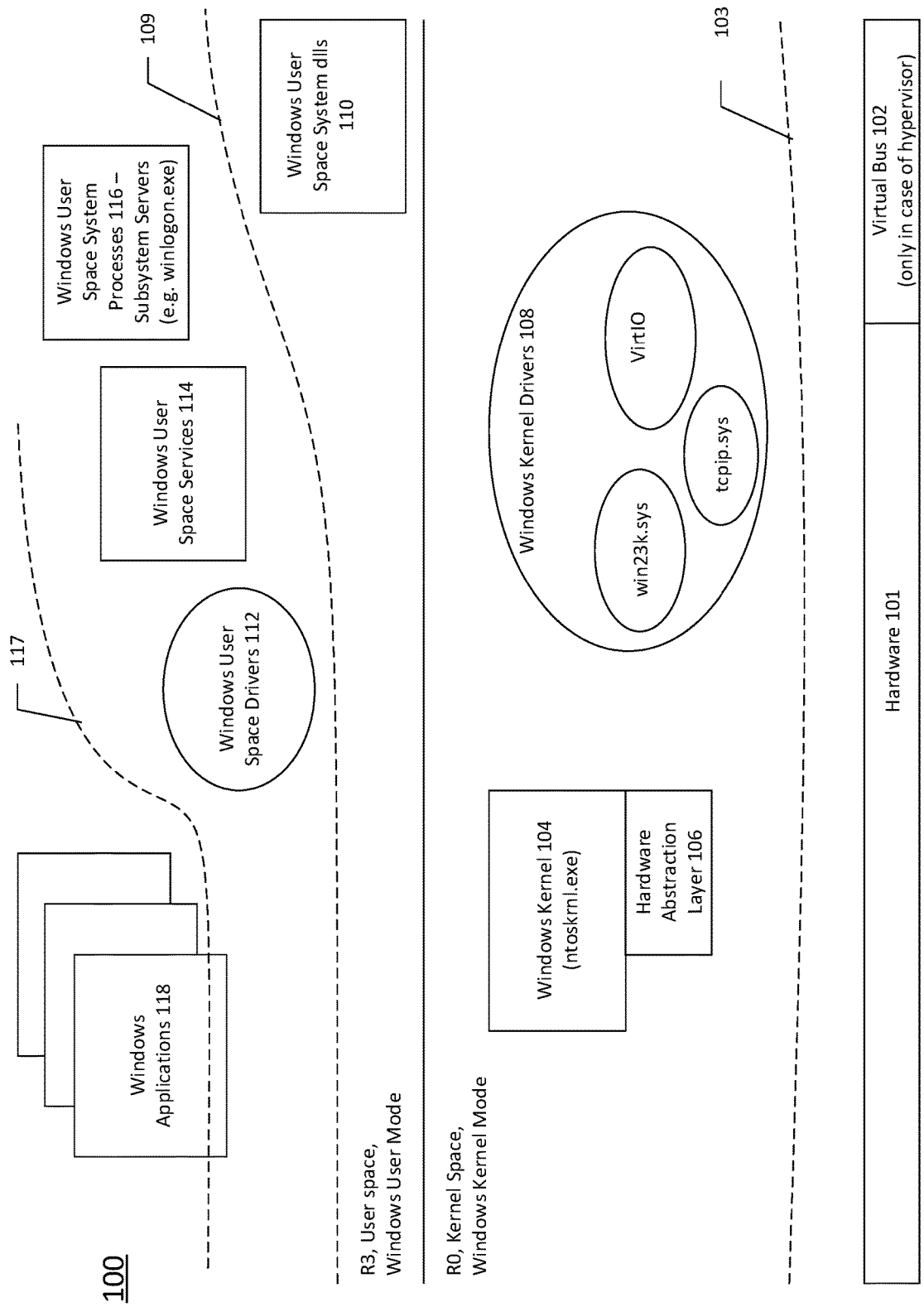
FIG. 1A illustrates a block diagram of the architecture of an operating system (OS) (WINDOWS was taken as an example).

FIG. 1A illustrates a block diagram of the architecture of an operating system (OS) (WINDOWS was taken as an example) running on an operating system 100.

The computer system 100 includes a Windows OS that executes on hardware 101. In some instances, the system 100 may include a virtual bus 102 in the case where a hypervisor is used on system 100. The hypervisor emulates the entire hardware and virtual bus layer. Windows OS comprises a Windows Kernel 104 and a hardware abstraction layer (HAL) 106. The Windows Kernel 104 is, for example, a file named "ntoskrnl.exe". The Windows OS further comprises kernel drivers 108 (e.g., win32k.sys which implements, for example, system calls dedicated to GUI, tcpip.sys which is a driver that provides TCP/IP services, and VirtIO® which provides virtualized disk and network drivers when the hypervisor is used). The Windows kernel 104, the HAL 106 and the kernel drivers 108 are all located in kernel space and are only accessibly by a processor when it is in a privileged mode (e.g., protection ring "0" in Intel processors).

The Windows OS further provides a "user mode" components, which operate in user space in non-privileged mode (e.g., protection ring 3, referred to as "R3" below). The user space generally comprises Windows user space system dynamically linked libraries (DLLs) 110, e.g., "ntdll.dll", user space drivers 112, user space services 114, user space system processes 116 and windows applications 118. The windows user space processes 116 may comprise subsystem servers such as "winlogin.exe", "crss.exe", "smss.exe" or others.

Similar to the architecture of Windows OS shown in FIG. 1A, other operating systems comprise their own unique architecture, but generally provide applications in user space that execute only in non-privileged mode. These applications can call user space drivers (e.g., user space drivers 112), user space services (e.g., user space services 114), or user space processes (e.g. processes 116) along with system dlls (e.g., user space system dlls 110) which communicate with lower level kernel components only available in privileged mode (e.g., protection ring "0", referred to as "R0" below). Similar to the architecture shown in FIG. 1A, other operating systems execute the kernel in privileged mode (e.g., protection ring "0") and allow access to the hardware 100 by user space applications though kernel, drivers (e.g., kernel drivers 108) and a hardware abstraction layer (e.g. HAL 106). Such restriction of resource access via protection rings (also referred to as privilege levels) is common to most operating systems and processor architectures and prevents corruption of the underlying hardware.

Figure 1B:
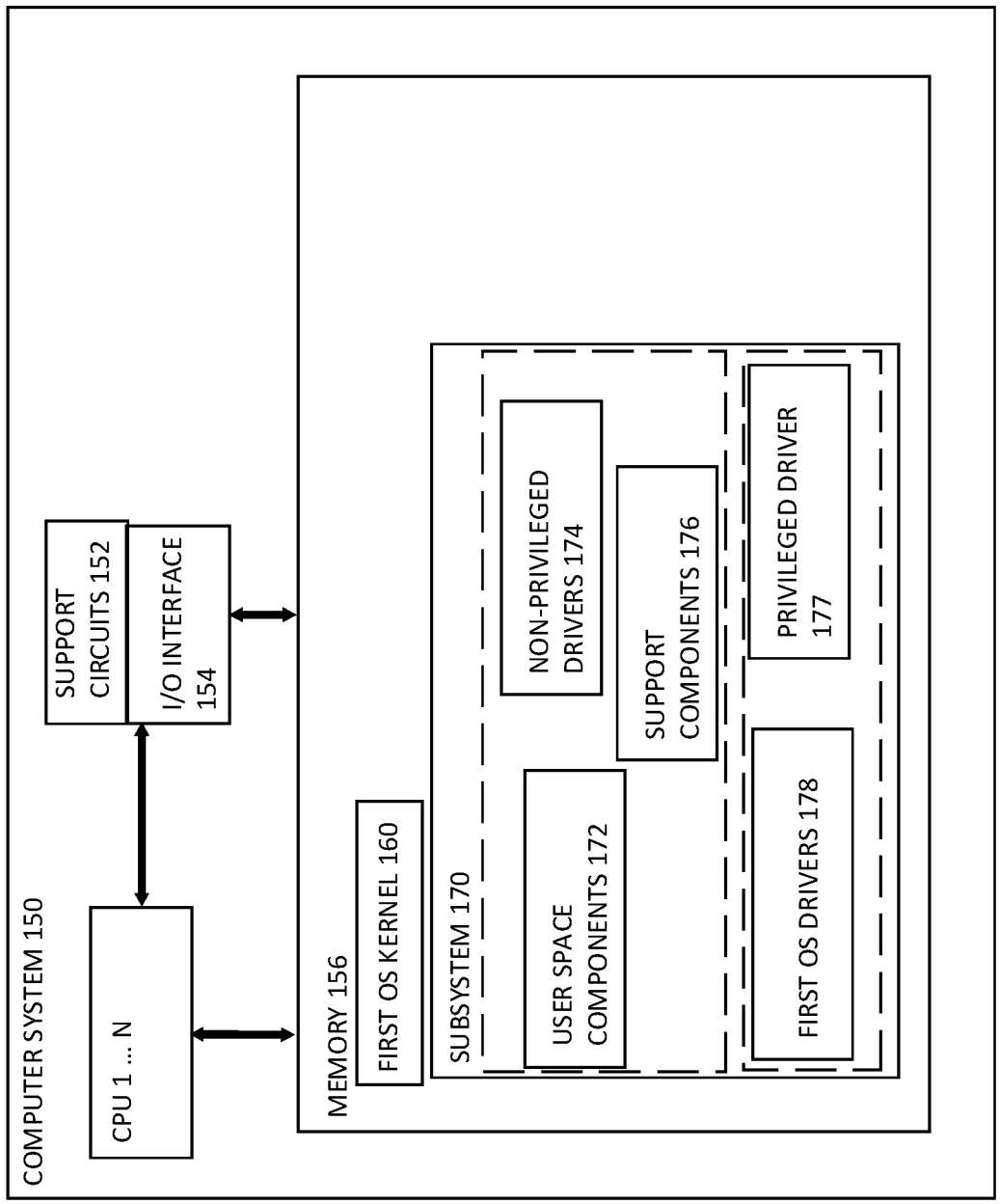
FIG. 1B illustrates a block diagram of a computer system 100 for executing applications in a non-native environment in accordance with an aspect of the disclosure.

In one aspect of the present disclosure, a computer system 150 of FIG. 1B allows applications which natively execute on a first operating system (e.g. Windows) to execute on a second operating system (e.g., Linux) by separating out various components shown in FIG. 1A into the collection of components shown in FIG. 1B. Those of ordinary skill in the art will understand that in some instances, the components are merely logically organized, and may not be allocated in memory 156 strictly as shown in FIG. 1B, but are illustrated so as to show the performative aspects of each component. Those of ordinary skill in the art will understand for example, that the subsystem 170 may be a logical compartmentalization of the various components within.

The system 150 of FIG. 1B comprises one or more of central processing units (CPUs) 1 to N. The CPUs 1 to N are coupled to support circuits 152 and an input/output (I/O) interface 154 which communicates with external input and output devices with the aid of support circuits 152. The CPUs 1 to N, the support circuits 152 and the I/O interface 154 are all coupled to memory 156.

The computer system 150 executes a first operating system (OS), which has a first OS kernel 160. The first OS kernel 160 controls access by other OS components such as processes and applications to the I/O interface 154 via support circuits 152. The one or more CPUs 1 to N may be of any architecture. In one aspect, the CPUs 1 to N are Intel® processors, while in another aspect, the CPUs 1 to N are AMD®, MIPS® or RISC® processors. The CPUs 1 to N are not limited thereto, however.

The CPUs 1 to N may have different privilege levels, or protection rings (e.g., numbered from "0", most privileged, to "3", least privileged), which protect access to resources of the computer system 100, mainly memory, I/O ports and the ability to execute certain machine instructions. At any given time, a CPU is running in a specific privilege level, which determines what code can and cannot do, and also how instructions will be executed and which effect they will have. These privilege levels are often described as protection rings, with the innermost ring corresponding to highest privilege. Most modern kernels (e.g., x86 kernels such as Windows and Linux) use only two privilege levels, 0 and 3. In other words, code (usually OS kernels) executing on CPUs 1 to N in privilege level "0" (also referred to as protection ring "0") are given access to the memory, ports, and critical machine instructions, while processes (non-kernel processes) executing in privilege level "3" (also referred to as protection Ring "3") are prevented from accessing these resources and can only access memory addresses in the "user space" range.

The first OS kernel 160 is stored in the memory 156 and executed by the one or more CPUs 1 to N in protection ring "0" in order to run a first Operating System (e.g, Linux).

Additionally, the memory 156 has stored thereon a subsystem 170 which represents a subsystem of a second OS (e.g., Windows) which has portions executing in protection ring "0" and portions executing in protection ring "3".

The system 100 also comprises a native subsystem of the first OS for example, that is not shown in FIG. 1B, containing first OS components comprising at least: drivers, services, daemons, applications and the like depending on the first OS architecture.

The subsystem 170 comprises several inter-connected components which will be described later in detail in FIGS. 2-11. According to one aspect, the subsystem is merely a logical distinction of the components, and not a segregated space in memory 156, since many of the components of subsystem 170 operate on various portions of the memory 156 and may use different privilege levels of a CPU.

The subsystem 170 comprises, in one aspect, user space components 172, non-privileged drivers 174, one or more support components 176 providing exports (in some aspects, also called export components) and first OS drivers 178. In some aspects, privileged driver 177 can comprise a first OS driver providing second OS kernel exports and system calls in R0, and 176 can comprise support component providing second OS kernel exports in R3. The user space components 172 are one or more components such as applications, that normally execute natively on a second OS, but are executing on the first OS through the aid of the other components in the subsystem 170. In some aspects, no changes are made to these components at all. For example, the one or more components may be Windows applications such as WORD, EXCEL, or the like. In some aspects of the disclosure, minimum modifications are made to the user space components 176 in order for them to execute in the non-native, a significant improvement over other solutions. In one aspect, a small amount of changes are made to the binary code of the user space component.

In order to execute the user space components 172 the present disclosure further may provide non-privileged drivers 174 and one or more export components 176. The user space components 172, the non-privileged drivers 174 and the one or more export components 176 may, in one aspect, only operate in non-privileged mode of the one or more CPUs 1 to N, and does not directly access hardware (i.e., call other components to perform actions with devices) of the computer system 100. In one aspect, non-privileged mode is equivalent to protection ring "R3" in the case of INTEL processors.

The non-privileged drivers 174 may comprise drivers that provide "high-level" (or "top-level") functionality of a normal driver associated with the second OS. These drivers are native to second OS and run in the environment as they are or with minor modifications to their code. Previously they could be a part of 108. The non-privileged drivers 174 may also work in non-privileged mode and may include drivers that use hardcoded addresses (such hardcoded addresses depend on the architecture of the second OS, and for example, for Windows they can be page tables, page with shared data, page providing system time to user applications), but, in one aspect, do not work with the hardware of the computer system 100 directly.

In other words, the non-privileged drivers may be isolated from invoking privileged mode of the one or more CPUs 1 to N, and therefore cannot corrupt or damage the first OS kernel 160. The non-privileged drivers 174 also do not use privileged instructions, which are instructions on the CPUs 1 to N that can only be executed in privileged mode.

Examples of non-privileged drivers 174 include WDF (windows driver frame work) or UMDF windows drivers frame work, i.e. user mode drivers.

In some instances, there may be drivers in the non-privileged drivers 174 which are native to second OS and generally do not use privileged instructions of the CPUs 1 to N, except for particular instructions (e.g., cli and sti used to prohibit interrupts). In these instances, such instructions are removed from the non-privileged drivers 174 using a plug-in which replaces the instructions with their non-privileged analog instructions, or replaces the instructions with a "No Operation" instruction.

In the case where a hypervisor is used on computer system 150 in order to virtualize the hardware resources of the computer system 150, para-virtualized drivers of the second OS are also a part of the non-privileged drivers 174. In some aspects, non-privileged drivers 174 include para-virtualized drivers that do not work directly with hardware such as writing to a video card, a network interface card, ports, disks device memory and the like, but instead communicate with special components of the first OS (e.g., some drivers among the drivers 177) such as particular drivers, user space processes, libraries, and the like. In one aspect, para-virtualized drivers from a kernel-based virtual machine (KVM) can be taken, and the new driver (a part of drivers 177) will be the component that the para-virtualized drivers communicate. Such new component can be created so that it has similar logic to KVM Virtio library, but may work without a hypervisor. For example, paravirtualized devices logic remains almost the same except the transport library or API that transfers data from second OS subsystem to first OS special components.

The one or more export components 176 also operate in non-privileged mode, which is referred to as protection ring "R3" in INTEL processors. The one or more export components 176 are re-implementations of high-level functionality of a kernel of the second OS. In one aspect, "High-level" means that there is no direct access to hardware, privileged instructions or privileged system data, e.g., direct access to page tables.) For example, the one or more export components 176 may re-implement high-level functionality of the Windows kernel, "ntoskrnl.exe", though in other instances other OS kernel exports can be implemented. In some aspects, the one or more export components 176 comprise an IO manager, EX-subsystem which works with handles (e.g., object manager handles for files, devices, even events, and any kernel objects, e.g., semaphores, processes, etc.) and high-level logic of a scheduler. The one or more export components 176 may also provide exports of the second OS kernel, where in some instances the one or more export components 176 export all functions that are exported in the second OS kernel. For example, the "ExAllocatedPool" function in the Windows kernel is exported from one component in the one or more export components, and is relied upon by, for example, "tcpip.sys". Though this is a WINDOWS example, other OS kernel exports that are relied on in the user space can also be exported. Thus the one or more export components 176 provide kernel functions to the non-privileged drivers 174 while isolating the non-privileged drivers 174 from the first OS kernel 160. It is appreciated that moving the exports from a kernel level to the one or more export components also provides for a faster mechanism for a non-privileged driver 174 to perform an operation than invoking a system call that is required to be performed in privileged mode of the one or more CPUs 1 to N, in turn saving processor cycles and increasing efficiency of the computer system 150. Further, the computer system 150 is significantly safer when more calls that are offloaded from privileged mode because less code has access to instructions that may cause damage to the first OS kernel 160.

The privileged driver 177 supports subsystem 170. According to one aspect, the privileged drivers 177 may be a driver native to the first OS and may be a para-virtualized re-implementation of a portion of the kernel of the second OS (e.g., a portion of ntoskernel.exe in WONDOWS). The privileged driver 177 provides parts of the second kernel API that works directly with hardware, uses privileged instructions. The privileged driver 177 receives system calls (retransmitted by first OS kernel) from the one or more user space components 172, from the non-privileged drivers 174 and the export components 176. The privileged driver 177 translates the calls to a format usable by the first OS kernel 160. For example, abstractions, data structures and arguments of functions that are generally associated with the second OS are translated into abstractions, data structures and arguments of functions that are generally associated with the first OS by the privileged driver 177. In one aspect, privileged driver 177 may need functionality provided by the support components 176 and perform a callout (e.g., using the first OS kernel 160).

Whenever the subsystem 170 may need to call an API of the first kernel or a low-level operation such as allocating memory or switching threads, the privileged driver 177 performs a translation and/or reformatting (referred to as a transformation) of the abstraction from the second OS style to the first OS style. The privileged driver 177 may invoke the first OS kernel 160 to execute the transformed call and obtain a response to the transformed call from the first OS kernel 160. Once the response is received, the privileged driver 177 transforms the result into a format that the components of subsystem 170 can interpret (e.g., back into WINDOWS abstractions, data structures, etc.), and returns the response to whichever component invoked the call.

In some aspects, user space components 172, non-privileged drivers 174 or export components 176 may make a system call to functionality that is not present in the first OS kernel 160, such as MDL, data prom PCI bus, data of a plug and play manager or the like. In this aspect, the first OS kernel 160 is modified to include this functionality, or the privileged driver 177 implements this functionality In some instances, it may be necessary for the user space components 172, the non-privileged drivers 174 or the one or more export components 176 to access devices that are only accessible by the first OS kernel 160. In this case, the subsystem 170 further comprises a set of drivers for the first OS, or first OS drivers 178, that support the subsystem 170. The first OS drivers 178 operate in privileged mode of the CPUs 1 to N, or protection ring "0" on INTEL processors. The first OS drivers 178 are drivers native to the first OS that provide the subsystem 170 the ability to work with devices on the computer system 150. In the Windows OS architecture shown in FIG. 1A, the windows kernel drivers 108 previously provided such functionality, which works directly with hardware of computer system 150, such as Ethernet drivers, video card drivers and the like.

The first OS kernel 160 is a modified version of a standard OS kernel. The first OS kernel 160 receives at least some of: exceptions (e.g., page faults), interrupts, events and direct transfers to kernel mode (e.g., system calls) from the user space components 172, non-privileged drivers 174 and one or more export components 176. For example, if the first OS is LINUX, then the first OS kernel 160 is a modified LINUX kernel and if a page fault is generated from an address that is assigned to or reserved for the subsystem 170, the subsystem 170 transfers the fault to 177.

Figure 2:
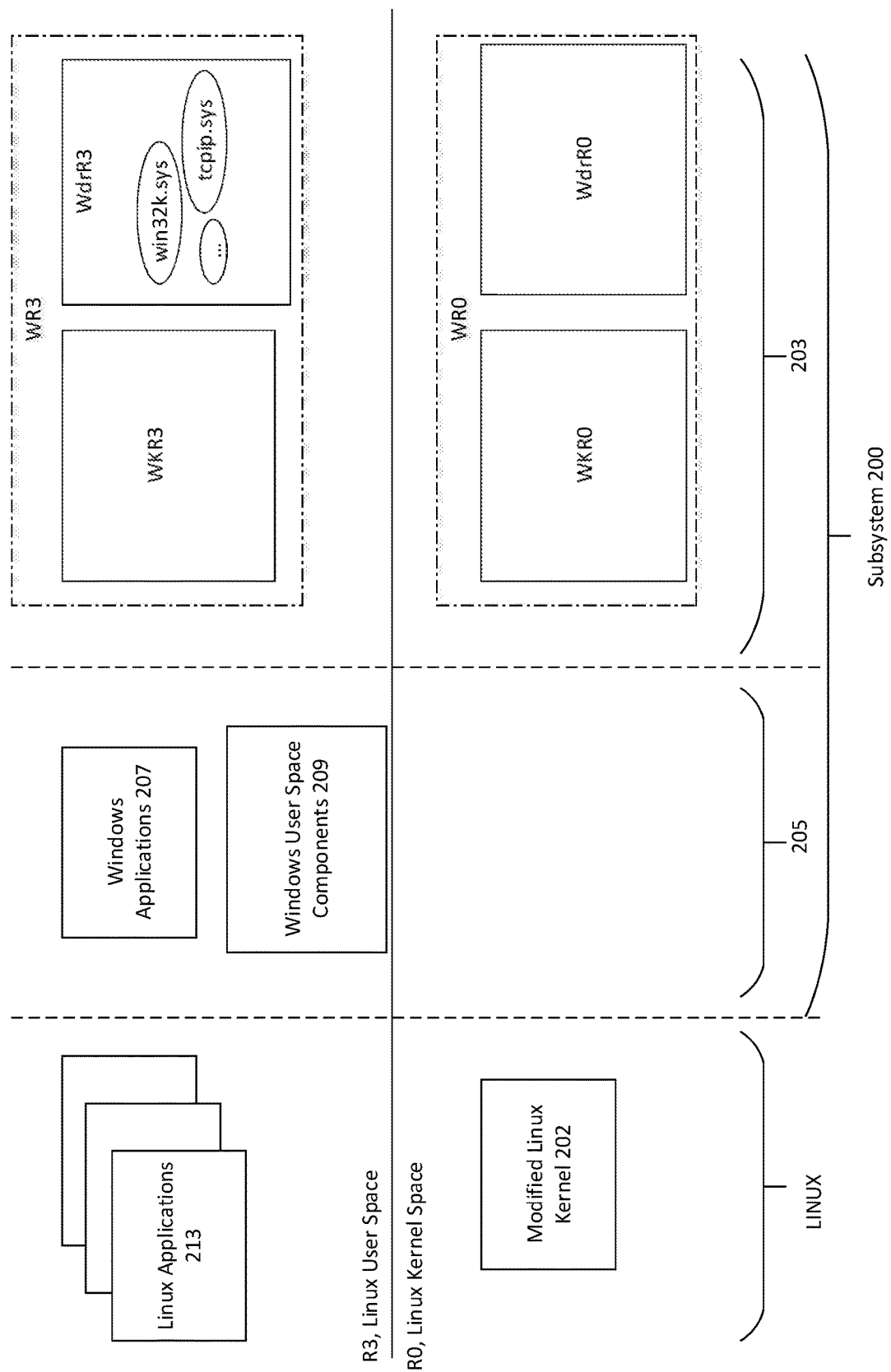
FIG. 2 illustrates a block diagram of components of the system 100 for executing applications in a non-native environment in accordance with an aspect of the disclosure.

In FIG. 2, an example is shown where the first OS is LINUX and the second OS is WINDOWS according to one aspect of the disclosure.

The LINUX OS contains the modified LINUX kernel 202 which is executing in kernel space in privileged mode, e.g., protection ring "0" of the INTEL processor. Additionally, the LINUX OS contains a user space components e.g., LINUX applications 213 native to LINUX can execute. This user space exists in non-privileged mode which allows access to memory that is not in kernel space, referred to as non-privileged mode, or protection ring "3".

The WINDOWS subsystem 200 is an one implementation of the subsystem 170 described with respect to FIG. 1B as applied to executing applications that are native to the WINDOWS OS. The subsystem 200 comprises WR0 and WR3 in a portion of memory 203 that was previously considered to operate in WINDOWS kernel space. The WINDOWS subsystem 200 further comprises WINDOWS applications 207 and WINDOWS user space components 209, comprising services, drivers, processes (subsystem servers), and system DLLs, in a portion of memory 205 that was previously WINDOWS user space. WR3, the WINDOWS applications and other servers all operate in protection ring R3, while WR0 operates in protection ring R0.

WR0 (which is the ring "0" part of the second OS subsystem) comprises WKR0 (example of a privileged driver 177) that provides low-level functionality of the Windows kernel mode components using calls to the LINUX kernel API. WKR0 is a LINUX driver that supports the WINDOWS subsystem 200. In one aspect, WKR0 is a reimplementation (working in the first OS) of a large portion of the ntoskrnl.exe. For example, in one aspect, WKR0 provides those part of the WINDOWS kernel API that directly works with hardware and that need privileged instructions. WKR0 handles systems calls from the WINDOWS applications and WINDOWS user space services, drivers, processes and system DLLS shown in FIG. 2. As described in FIG. 1B, WKR0 translates system calls from the style used in WINDOWS components to LINUX style calls, abstractions, formats, data structure and parameters.

In one example, WKR0 (an example of privileged driver 177) gets the Windows MDL structure from protection ring "3" in a request for locking pages. The corresponding Linux API is called by WKR0, but prior to this, WKR0 creates a Linux structure needed for this API call and stores data from MDL to the created structure. In this example, WKR0 does not lock pages, but changes format of data from Windows to the structure for a Linux API call and then perform the call so the modified LINUX kernel 202 will lock the page. Similarly, when one of the user space components asks for memory allocation, WKR0 may not work with memory pages directly, but may call a corresponding function of the modified LINUX kernel 202.

An illustrative example is a function that allocates memory, for example. WKR0, in this example, performs some actions with the parameters given to a WINDOWS function and calls the equivalent LINUX function. Say that the function to allocate memory in WINDOWS takes the parameter: arg1, arg2, arg3, arg4 and was called by one of the user space components. The modified LINUX kernel 202 has an analogous native function that takes the parameters arg5, arg6 and arg7. WKR0 will translate the parameters arg1, arg2, arg3 and arg4 into the parameters arg5, arg6 and arg7 (or gets suitable values for any parameters arg5, arg6 and arg7, if they cannot be obtained from arg1, arg2, arg3 and arg4) in order to correctly invoke the LINUX function. In some aspects, one Windows syscall can be represented by a sequence of Linux API calls, or several (e.g., sequential) Windows system calls can be performed using only one Linux API call. WKR0 then calls the LINUX function and modifies the returned value so that the returned value may be returned as WINDOWS function return value, thus abstracting away the LINUX call so the original WINDOWS application or user space component that invoked the system call need not be concerned about the underlying OS conventions.

WR0 further comprises WdrR0 (example of first OS drivers 178) which is a set of LINUX drivers that are responsible for providing the WINDOWS subsystem 200 the ability to work with devices coupled to the system, e.g., computer system 150. In one aspect, WdrR0 work directly with what used to be low-level WINDOWS drivers that work directly with hardware. Some drivers that WdrR0 replaces the functionality of include Ethernet drivers and video card drivers WR3 comprises WKR3, which is a reimplementation of high-level functionality of the WINDOWS kernel (e.g., ntoskrnl.exe) working in Linux in R3. WKR3 is an example of the export components 176. Examples of WKR3 can, in some aspects, contain IO managers, can be a Windows EX-subsystem which works with handles, high-level logic of a thread and process scheduler. WKR3 also provides exports of the ntoskrnl.exe, or may export all functions that are exported from ntoskrnl.exe or other second OS components. For example, the TCPIP driver, tcpip.sys, imports the "ExAllocatePool" function, which in FIG. 2 is provided as an export by WKR3. WKR3 also performs any system calls by the WINDOWS subsystem 200 to protection ring R0. By providing WKR3, high level drivers can be run as-is in the system and can rely on exports provided in protection ring R3. High-level drivers accessing exported functions from WKR3 in the same protection ring is significantly faster for a CPU than performing system calls to protection ring R0, thus an improvement in the functioning of a computer system is achieved. Additionally, WKR3 contains as much ntoskrnl.exe functionality as possible to reduce the amount of code that is executed in protection ring R0, making the overall system significantly safer from corruption—particularly the modified LINUX kernel 202.

WR3 also comprises WdrR3 which is a set of WINDOWS "high-level" drivers that work in protection ring R3, do not work directly with hardware and do not use privileged instructions (except particular allowed instructions). As described above, WdrR3 is an example of the non-privileged drivers 174 in FIG. 1B. WdrR3 are generally only slightly modified to NOP (no operation), i.e. ignored, for example, or may in some cases be used as is. For example, examples of drivers used as-is are win32ksys, tcip.sys. ntfs.sys, ndis.sys, fltmrg.sys—i.e., any drivers that do not work with the bus, miniports or directly work with devices.

Figure 4:
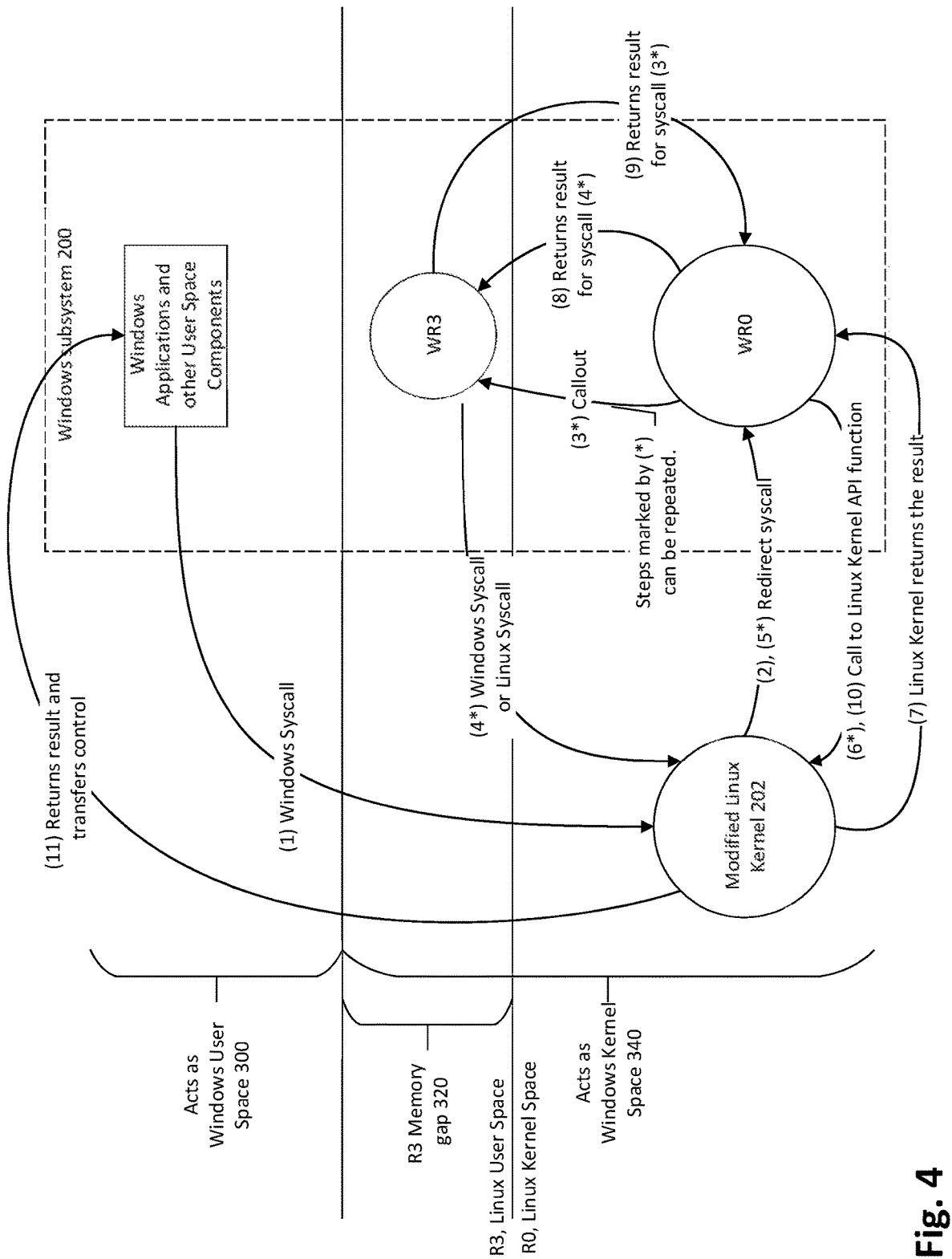
FIG. 4 illustrates the process flow of an application executing calls in a subsystem in accordance with an aspect of the disclosure.

FIG. 4 illustrates the process flow of an application executing calls in a subsystem in accordance with an aspect of the disclosure.

In one example, a WINDOWS application or other user space component (in user space 300) makes a system call (1) to the modified LINUX kernel 202 (in LINUX kernel space). In one aspect, WR3 works with application memory if needed between steps (3) and (4) below and between steps (8) and (9) below. The modified LINUX kernel 202 may redirects the system call (2) to WR0 (e.g., WKR0). Here, WR0 can ask the modified LINUX kernel 202 to perform a context switch from WINDOWS user space 300 to WR3, or the modified LINUX kernel 202 can perform the context switch itself.

WR0 performs a "Callout" (3) to WR3. WR3 then performs a WINDOWS system call, where "*" indicates that the step may be repeated. At this point, WRK3 communicates with WdrR3 to access memory in WINDOWS user space 300. System calls like opening a file can be called not only by the applications, but also by WR3 components. WR3 components work in user space, so to call any function of WR0 a syscall should be performed.

At (4), when WR3 may perform a low-level operation such as thread-switching, changing the page table, or the like, the system call is sent to R0. At (5), the system call arrives at the modified LINUX kernel 202, which redirects the system call to WR0. WR0 does not perform the system call itself, but instead WR0 translates the WINDOWS call to a LINUX API call, and formats all data structures used in the call from WINDOWS to LINUX at (6). WR0 may also call another LINUX service at (6).

At (7), the modified LINUX kernel 202 performs the low-level operations such as thread-switching or changing the page table. The result are returned and control is transferred to WR0. At (8), WR0 translates the result to WINDOWS format and returns the translated result to WR3. Optionally a LINUX API can be used to return the result to WR3.

At WR3 in (9), WR3 continues execution, finishes and returns the result for the callout to WR0. At (10) and (11), WR0 performs a context switch by calling the modified LINUX kernel 202, which transfers control to WINDOWS user space. Finally, control is transferred back to the WINDOWS application with the result.

The memory map of the memory 156 is changed by the first OS kernel 160. The first OS kernel 160 changes the memory map to create a memory gap 320. In this case, memory space normally belonging to non-privileged mode of the CPUs 1 to N still belong to the non-privileged mode. In other words, applications native to the first OS and the second OS will not notice an appreciable difference in memory access.

Figure 3:
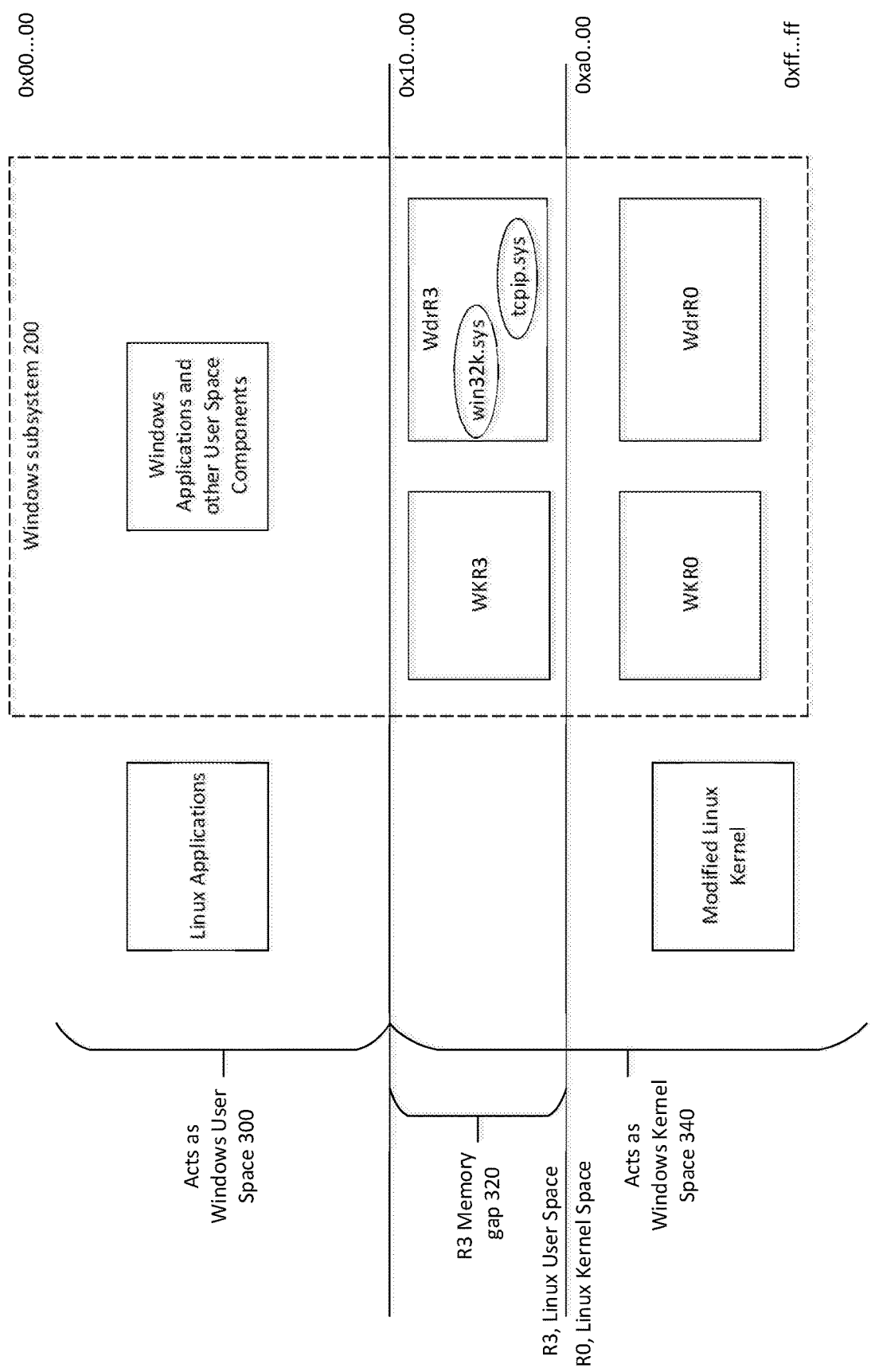
FIG. 3 illustrates memory configurations of the system of FIG. 1 in accordance with an aspect of the disclosure.

However, a range of addresses that an unmodified kernel would assign to privileged mode, are not also assigned to non-privileged mode, the range of addresses known as "gap memory". FIG. 3 illustrates the modified memory configurations of the system of FIGS. 1A-2 in accordance with an aspect of the disclosure. FIG. 3 shows an aspect of the disclosure where the first OS is LINUX and the second OS is WINDOWS, though other operating systems may have similar or different memory arrangements.

In FIG. 3, the memory address range from 0x00 . . . 00 to 0xff . . . ff of memory 156 of computer system 150 is shown. The memory 156 comprises a range from 0x00 . . . 00 to 0x0f . . . ff that acts as WINDOWS user space 300.

In one aspect, user space 300 comprises LINUX applications are executed and WINDOWS applications and other user space components are executed.

In one aspect, memory addresses from 0x10 . . . 00 to 0x9f . . . ff may act as R3 Memory gap 320. WKR3 and WdrR3 of FIG. 2 operate in the R3 Memory gap 320.

Finally, in one aspect, the memory addresses ranging from 0xa . . . 00 to 0xff . . . ff may act as kernel space 340. The modified linux kernel 202 from FIG. 2 resides in the acting kernel space 340, along with WKR0, WdrR0, WKR3 and WdrR3. In other words, the WINDOWS kernel space 340 may span both the LINUX kernel space and a portion of the LINUX user space.

Memory addresses from 0x00 . . . 00 to 0x9f . . . ff are in actuality OS LINUX user space, but will not be used by Linux applications. Similarly, addresses from 0xa0 . . . 00 to 0xff . . . ff are in LINUX kernel space.

The WINDOWS subsystem 200 operates across the WINDOWS user space 300, the R3 Memory gap 320 and the WINDOWS kernel space 340, or, in other words, across the R0 LINUX kernel space and the R3 LINUX user space. In some aspects, the memory gap can be a contiguous memory range, in other aspects it can consist of several different memory ranges. These address ranges depend on the architecture of the second OS.

Figure 5:
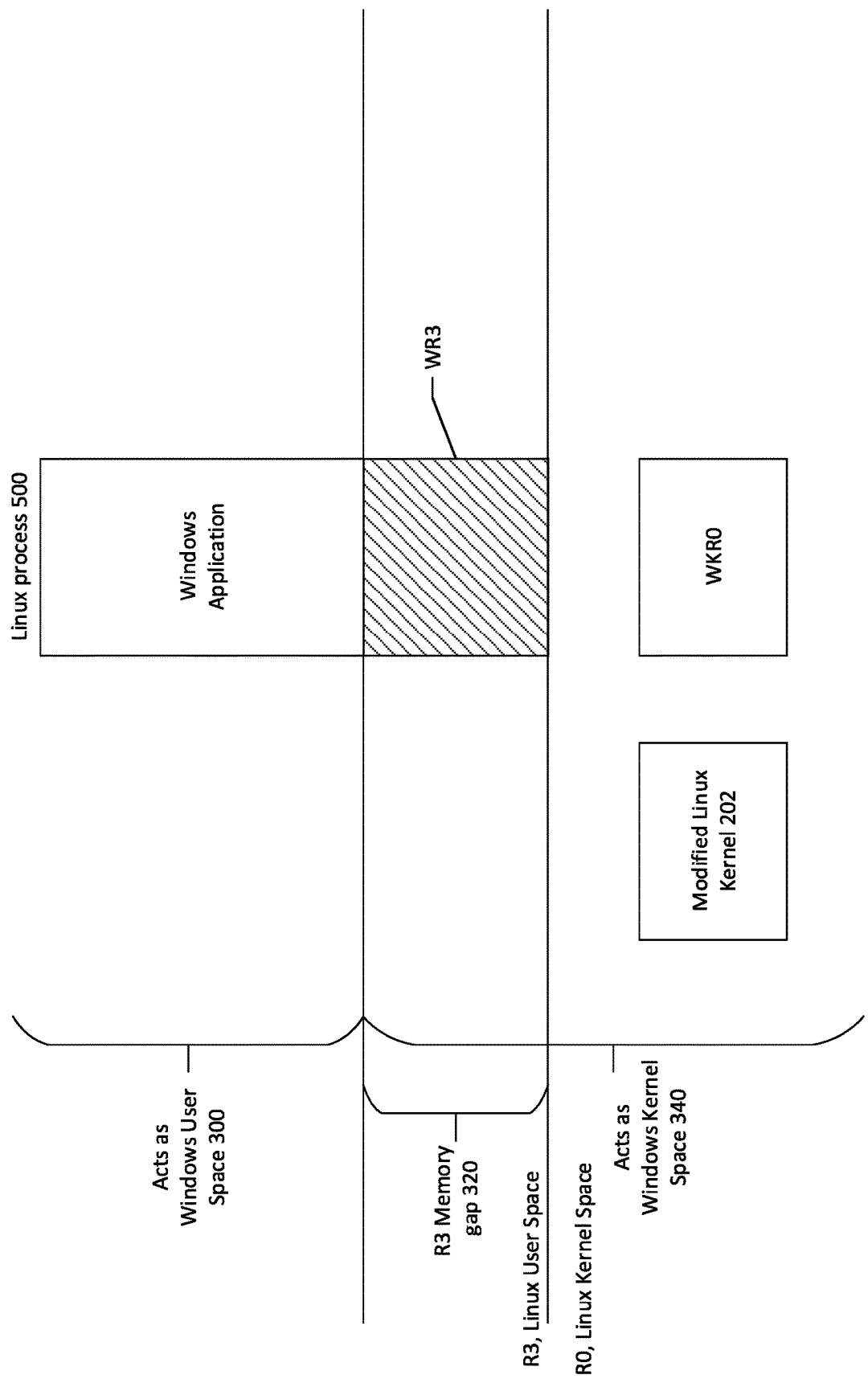
FIG. 5 illustrates a memory configuration of the system in accordance with another aspect of the disclosure.

A variant of such a memory configuration is shown in FIG. 5, where WR3 memory is isolated from WINDOWS user space 300. WR3 operates in protection ring R3, and is isolated from the modified LINUX kernel 202 which operates in protection ring R0. WR3 also is isolated from WINDOWS user space. However, then a context switch needs to occur between the WINDOWS user space and WR3. In a context for WINDOWS user space 300, R3 gap addresses are protected from access. In a WR3 context, the R3 gap addresses are, however, accessible. In one aspect, WR0 can request that the modified LINUX kernel 202 perform a context switch between Windows user space 300 and WR3. In another aspect, the modified LINUX kernel 202 performs the context switch itself depending on the type of an incoming system call.

The first aspect is illustrated in FIG. 5. Each WINDOWS process (as it used to be in the WINDOWS OS) is represented by one LINUX process (e.g., process 500) where the WINDOWS application runs. While the WINDOWS application is executing its binary code, the memory of this process contains only addresses assigned to Windows user space 300. Memory addresses that are assigned to WR3 (e.g., R3 address in the gap 320) are not available in this process in the user space context so that the running Windows application in LINUX process 500 cannot corrupt WR3 memory.

WR3 operates in the R3 memory gap 320 space and it is available or unavailable in a running LINUX process 500 depending on the WINDOWS context. In other words, the WINDOWS user space components cannot access this portion of WR3 memory. In this aspect, WR0 may ask the modified LINUX kernel 202 to make WR3 pages available or unavailable in the process 500. When the pages are available, this represents WR3 context. When the pages are unavailable, this represents Windows user space context where the portion of memory is protected from access by the Windows user space components.

Figure 6:
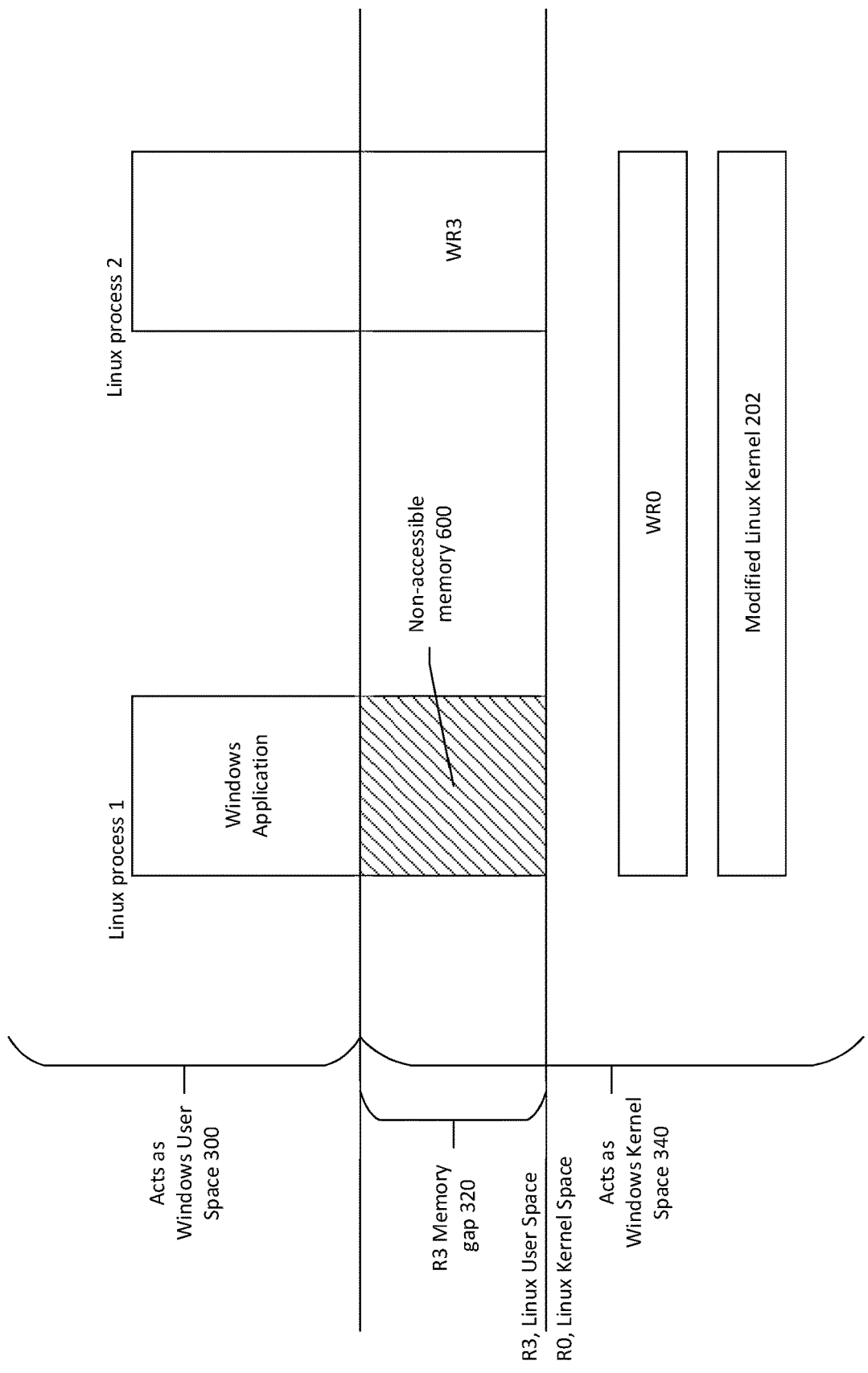
FIG. 6 illustrates a variant of the memory configuration illustrated in FIG. 5 in accordance with another aspect of the disclosure.

The memory configuration shown in FIG. 6 is an optimized variant of the configuration illustrated in FIG. 5. In FIG. 6, the WINDOWS kernel space 340 contains the modified LINUX kernel 202 and WR0. The R3 memory gap 320 contains the non-accessible memory 600 and WR3 depending on the process.

LINUX process 1 and LINUX process 2 are executing in R3 mode. LINUX process 1 is executing a WINDOWS application and represents the user space context. In process 1, WR3 pages 600 are unavailable. In process 2, the WR3 pages are available, where process 2 represents the Windows kernel context. WR3 code executes in process 2. However, both processes have access to the same user space memory 300 and can share memory and data. In this variant, context switches may be performed without resetting cache of the computer system by simply switching the processes whenever Windows subsystem 200 would like to switch context. Another advantage of this variant is that anytime a context switch is needed, WR0 simply asks the kernel 202 to switch processes so that WR0 does not need to request the kernel 202 to protect or, alternatively, make page tables available.

In this system, several Windows OSs can be run at the same time. WR3 of different processes will not interfere with each other, so they can belong to different processes. In this aspect, WR0 is modified so that it supports all needed versions of Windows. Namespaces and "cgroups" in LINUX can be used to have several instances of low-level Windows kernel structures (where low-level indicates those structures that are implemented in WR0, i.e. those structures that are needed to work with hardware).

In some aspects, each user space of a Windows OS (or even a separate Windows Application) can live in its own Linux container. Such containers can be nested. In other words, containers with applications can live inside a container with the entire OS user space.

Figure 7:
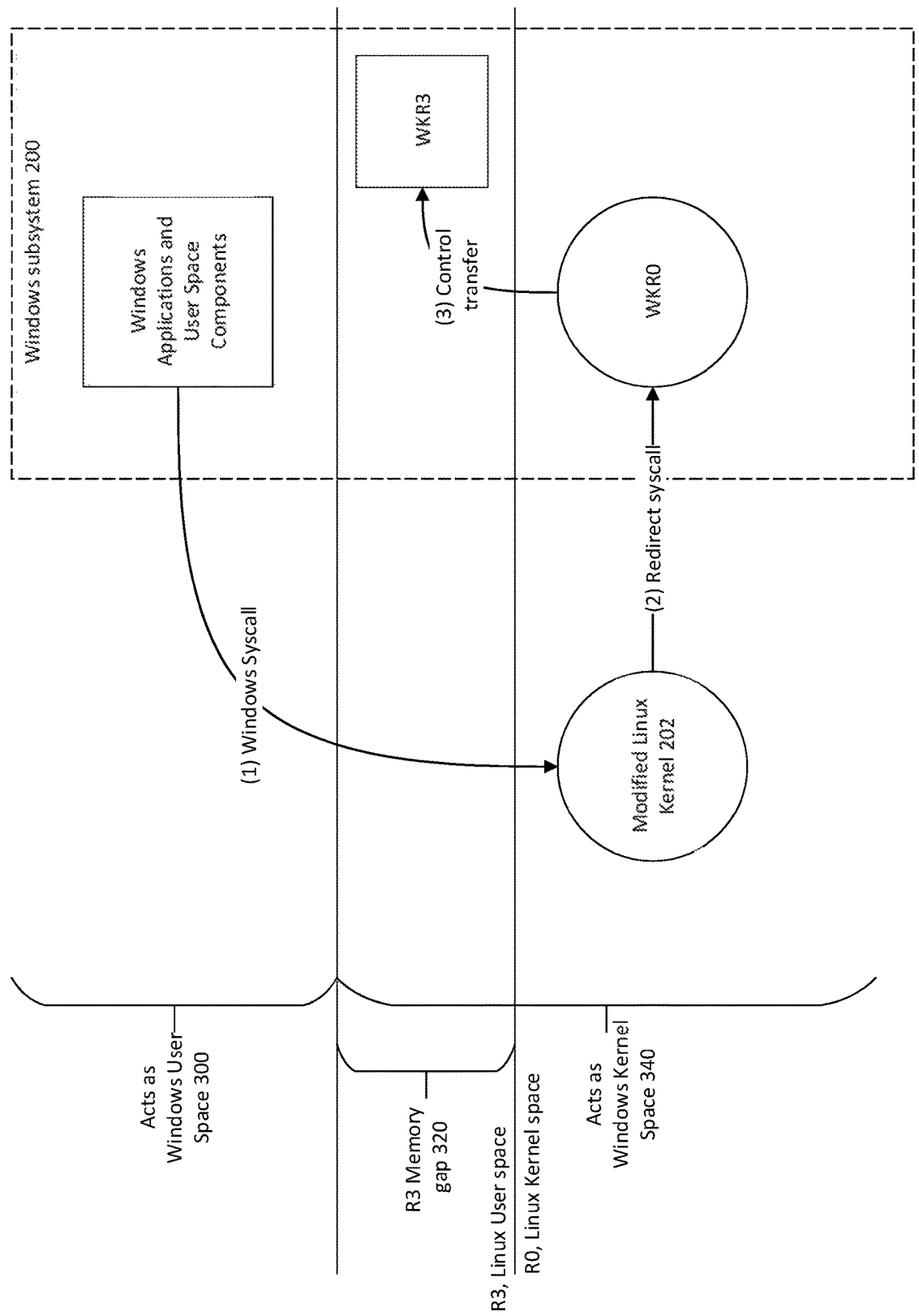
FIG. 7 illustrates a process of context switching in the subsystem in accordance with another aspect of the disclosure.

FIG. 7 illustrates a context switch between user space and the WR3 context. When the WINDOWS application wants to call a WINDOWS kernel function, or perform a context switch, a system call is made to R0 at (1). In one aspect, the system call may be received by the modified kernel 202 which retransmits the system call to WR0 at (2). WR0 calls a LINUX API to change the page tables or switch processes (depending on the variant of the system shown on FIG. 5 or FIG. 6) in order to make gap memory in R3 available. The modified kernel 202 performs the page tables change or context switch making pages with WR3 code and data available to process 500. Then the modified kernel 202 return control to WR0.

WR0 transfers control to WR3 at (3) by calling a special function of the modified kernel 202 Or alternatively the modified first OS kernel can itself transfer control to WR3, without giving control to WR0 and receiving a corresponding command from it. Such behavior can depend on the type of the syscall. Thus control is transferred to WR3 and a context switch is performed. Back in process 500, WR3 performs it's work—WR3 can access WR3 memory and WINDOWS application memory because the process is in the Windows R3 kernel context. In this context, WR3 can perform system calls to WR0 and the like. In some aspects, new entry points for kernel callouts are also implemented.

Once WR3 has completed, a system call is made to R0 which is received at the modified kernel 202. Once again, this system call is passed to WR0 which asks the kernel 202 make WR3 pages unavailable in process 500. The kernel 202 makes WR3 pages unavailable and transfers control back to the Windows application. The context has now switched back to the Windows user space context. In FIG. 7, the modified kernel 202 may switch contexts as described with respect to FIG. 6, or simply switch between Linux processes as described with respect to FIG. 6.

Figure 8:
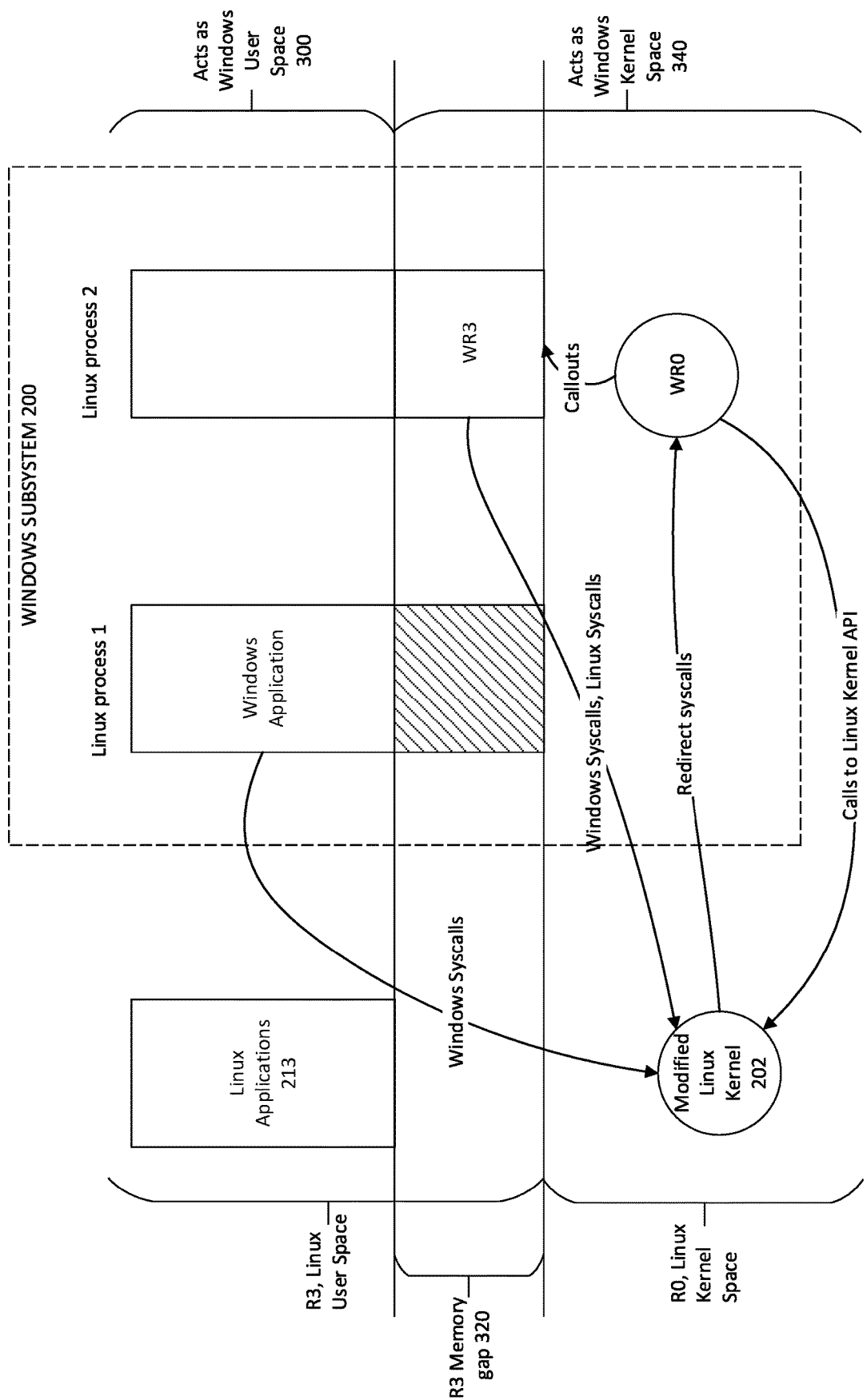
FIG. 8 illustrates the system incorporating two processes to execute applications in the non-native environment, in accordance with another aspect of the disclosure.

FIG. 8 illustrates the system incorporating two processes to execute applications in the non-native environment, in accordance with another aspect of the disclosure as illustrated in FIG. 6. The process flow of switching between processes represents switching between contexts. Instead, however, process 1 is running the application and stands in for the user space context, while process 2 stands in for the WR3 context and can access shared application memory and data with process 1, but can also access WR3 memory. FIG. 8 also shows possible calls in the system.

In one example, the Windows application executing in process 1 makes a Windows system call. The modified kernel 202 redirects the call to WR0, which performs callouts to WR3. WR3 performs whichever Windows system calls or LINUX system calls it needs to invoke. Control is transferred back by the modified kernel 202 to the process 1.

Figure 9:
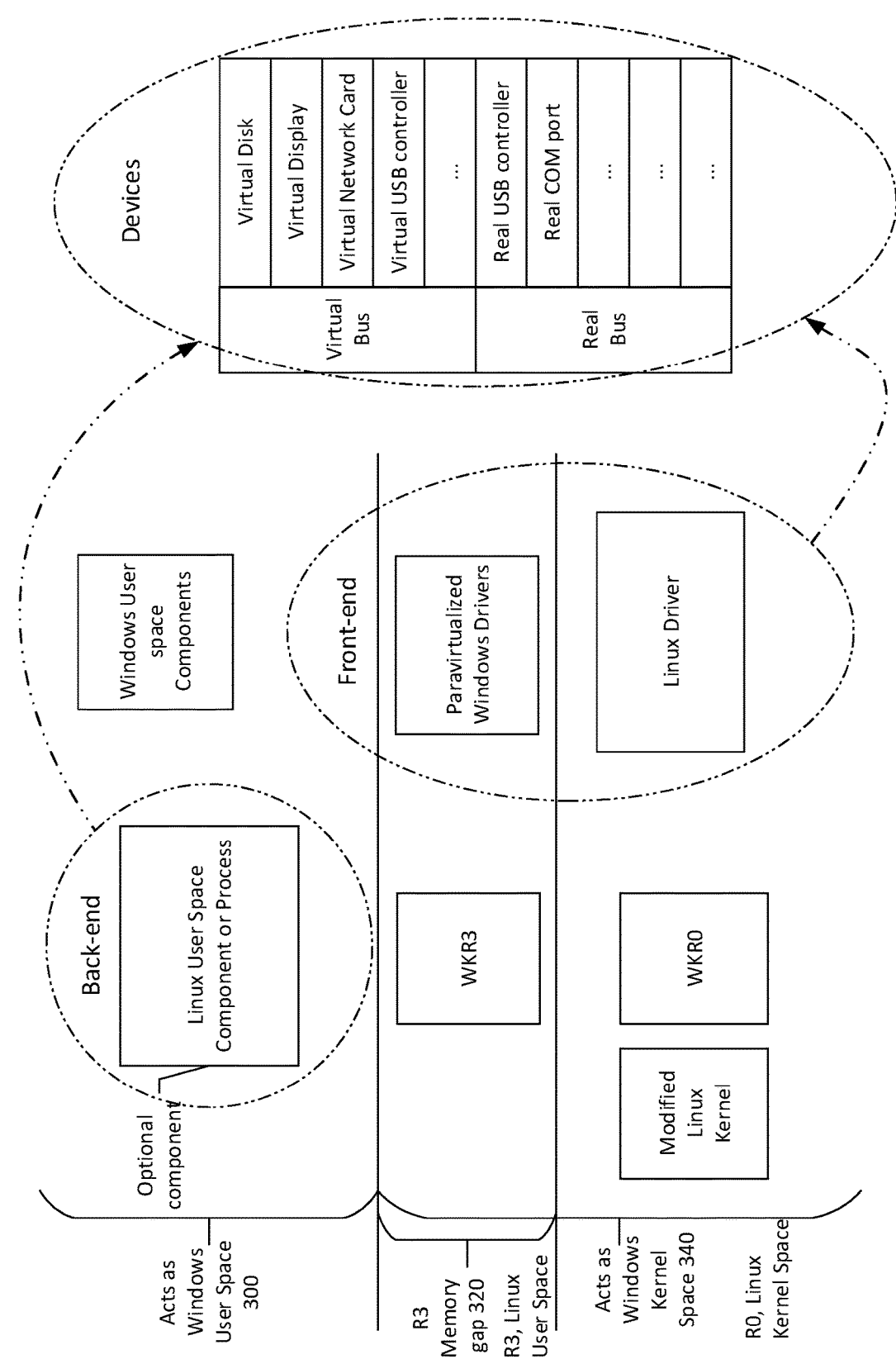
FIG. 9 illustrates components used in providing virtual drivers to the subsystem in accordance with an aspect of the disclosure.

FIG. 9 illustrates components used in providing virtual devices to the subsystem in accordance with an aspect of the disclosure.

Front-end refers to a portion of the systems above that it is running in the second OS subsystem 170 and is visible to the applications running in the second OS subsystem 170, and back-end refers to components outside of the second OS subsystem 170, and can be any of Linux applications, drivers, etc. The back-end is responsible for device emulation analogous to the logic of hypervisors.

In this aspect, the degree of isolation can be modified to accommodate "gradable isolation". The degree is modified by, for example, adding more or less functions to R3 or by forwarding devices.

In one aspect, fully virtualized virtual devices are used so that subsystem 200 was isolated like it was in a virtual machine (VM). Devices may be forwarded to WR0 as is customarily done in virtual machines (VM). In some aspects, no physical devices are concealed from WR0. Virtual devices (such as virtual disks, virtual display, virtual network interface card, and the like) can be created, in some aspects.

In another aspect, the isolation degree is less and the subsystem 200 acts more like a terminal server in Windows. With such gradable isolation, various system configurations can be achieved to create different environments in which the Windows subsystem 200 works. In one example, coherence can be implemented to allow a console window to be available to the subsystem 200 from LINUX.

Figure 10:
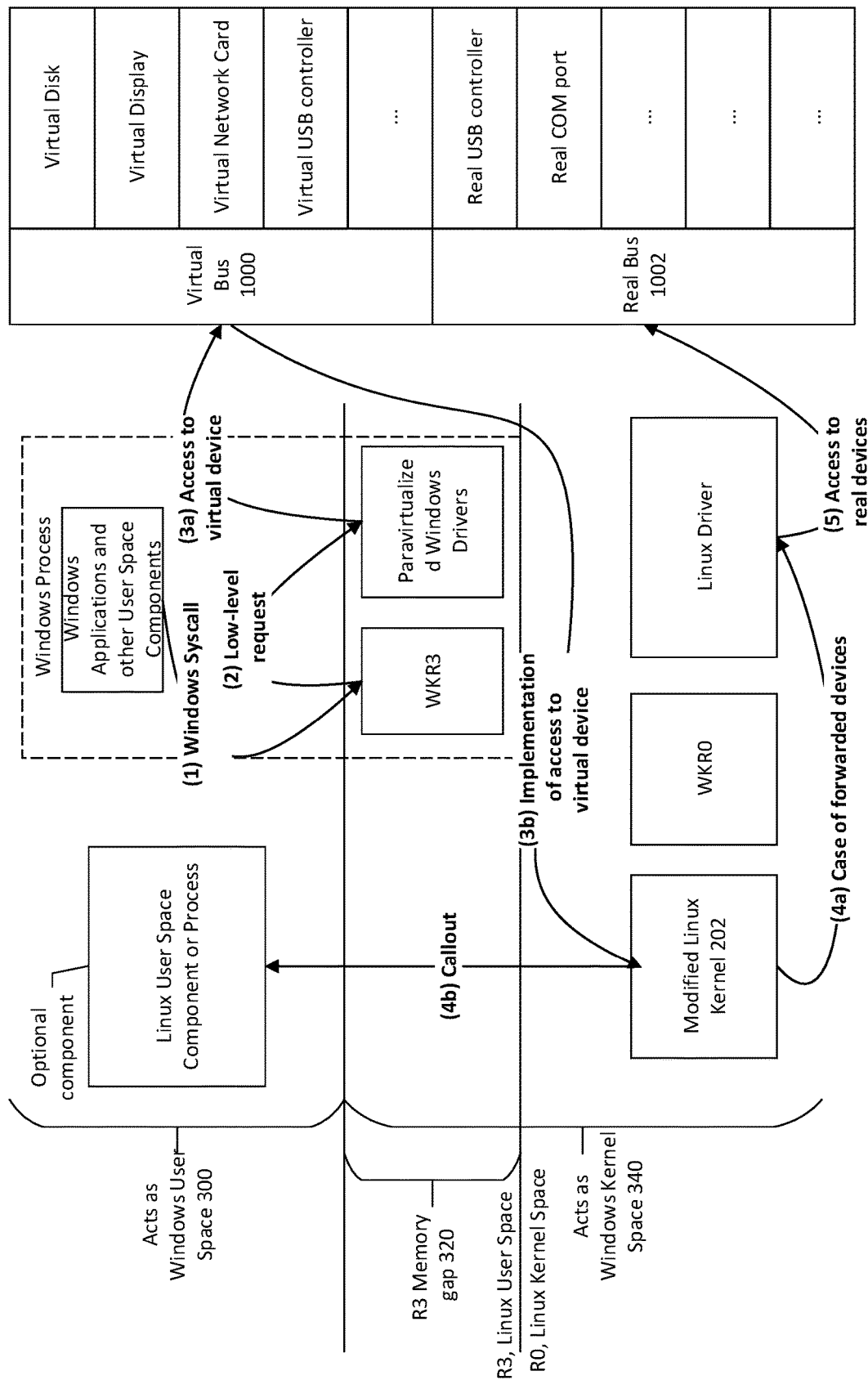
FIG. 10 illustrates a process flow of accessing devices by the subsystem in accordance with an aspect of the disclosure.

FIG. 10 illustrates a process flow of accessing devices by the subsystem in accordance with an aspect of the disclosure.

A WINDOWS user space component such as an application invokes a Windows system call (e.g., a high level request such as abstractions available for the applications, like files, http protocol, windows in GUI) at (1). WKR3 receives the system call and issues a low-level (e.g., working with block device sectors, sending packets via network card, etc.) request to the para-virtualized Windows drivers (e.g., WdrR3) at (2).

At (3a), WdrR3 accesses a virtual device by requesting the device via the virtual bus 1000. The virtual bus 1000 may comprise a virtual disk 1002, a virtual display 1004, a virtual network card 1006, a virtual USB controller 1008 and the like. However, virtual devices access is implemented by the modified kernel 202 at (3b). In the case of forwarded devices at (4a), WdrR0 is invoked which, in one aspect, may provide the subsystem 200 with the ability to work with devices. In the case of a callout at (4b), the kernel 202 invokes an optional LINUX user space component or process (for example, QEMU), which is responsible for providing the subsystem 200 the ability to work with devices. The optional component is located in windows user space 300. From (4a), WdrR0 accesses the real devices at (5) via the real bus 1002, comprising, for example, a real USB controller, a real COM port, and the like.

Figure 11:
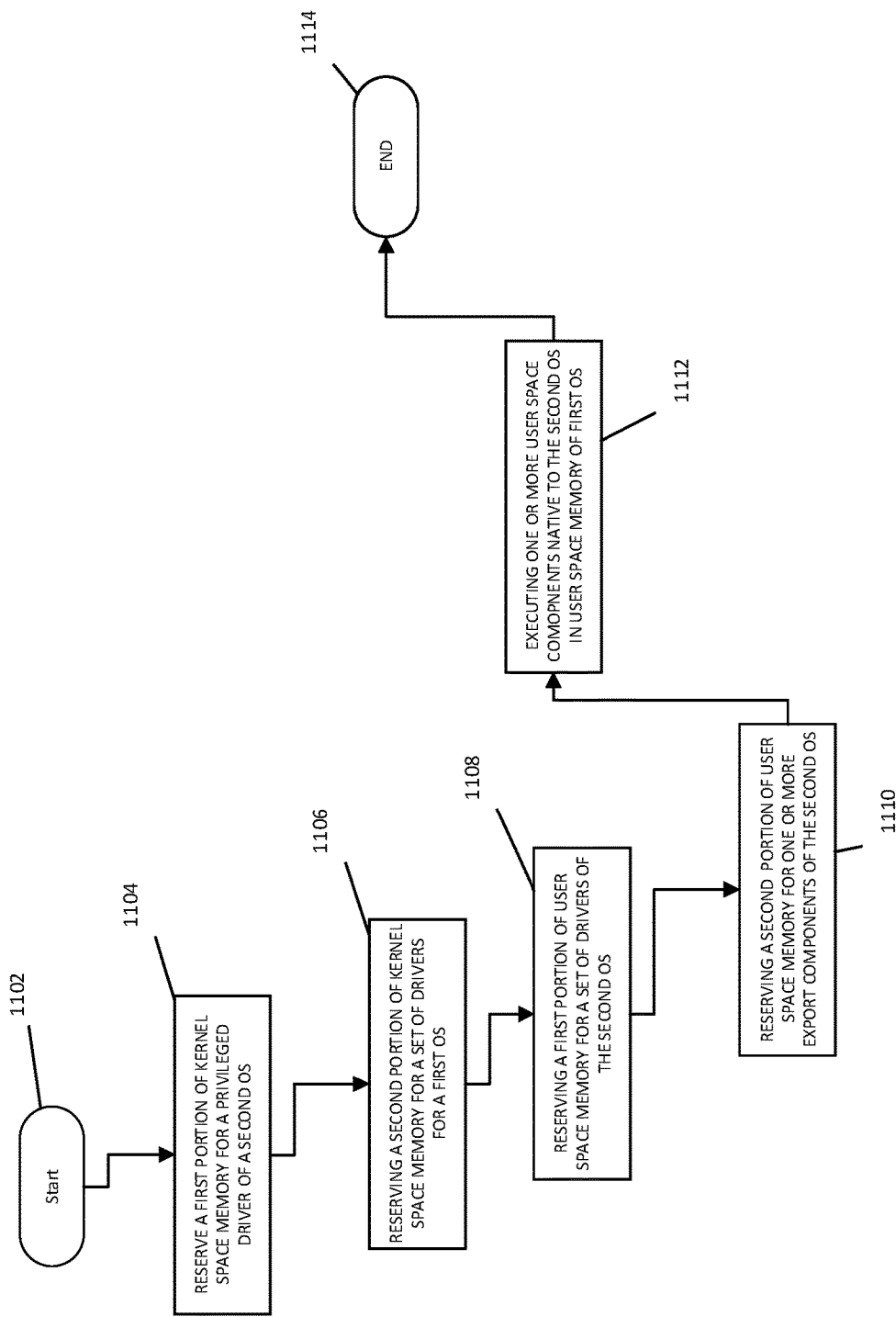
FIG. 11 illustrates a method for allocating memory for the execution of an application in a non-native environment, in accordance with an aspect of the disclosure.

FIG. 11 illustrates a method 1100 for modifying the memory of the kernel 102 in accordance with one aspect of the present disclosure, though other aspects are also contemplated. The computer system 170 is an example implementation of the method 1100 as executed by the CPUs 1 to N.

When the first OS boots, its memory manager configures the first OS memory map, i.e., assigns different regions of address space to different needs, for example, assigning which memory range will be available for user space, which will be available for kernel space, and the gap memory.

The method 1100 begins at 1102 and proceeds to 1104. At 1104, a modified kernel of a first OS reserves (alternatively referred to as "assigns") a first portion of kernel space memory for a privileged driver of a second OS. An example of the privileged driver is privileged driver 177 of FIG. 1B, and WKR0, which provide low-level functionality of the kernel operations of the second OS, and which call APIs of the first OS kernel.

At 1106, the modified kernel of the first OS reserves a second portion of kernel space memory for a set of drivers of the first OS. An example of the set of drivers is the first OS drivers 178 in FIG. 1B, and WdrR0 in FIG. 2. These set of drivers are responsible for providing other components described below the ability to access hardware devices.

At 1108, a first portion of user space memory is reserved for a set of drivers for the second OS. An example of the first set of drivers is the non-privileged drivers 174 of FIG. 1B and WdrR3 of FIG. 2 which are high-level drivers of the second OS. Some examples of a high level drivers are win32k.sys and tcpip.sys in Windows.

At 1110, a second portion of user space memory for one or more export components of the second OS is reserved. An example of the one or more export components is the export components 176 of FIG. 1B and WKR3 of FIG. 2. The one or more export components reproduce high level functionality of the kernel of the second OS and provides exports that the kernel of the second OS provides.

At 1112, one or more user space components are executed in a user space of the first OS, wherein the one or more user space components are native to the second OS. In one aspect, the one or more user space components may comprise second OS applications, services, drivers, processes such as subsystem servers, system DLLs and the like.

The method terminates at 1114.

Figure 12:
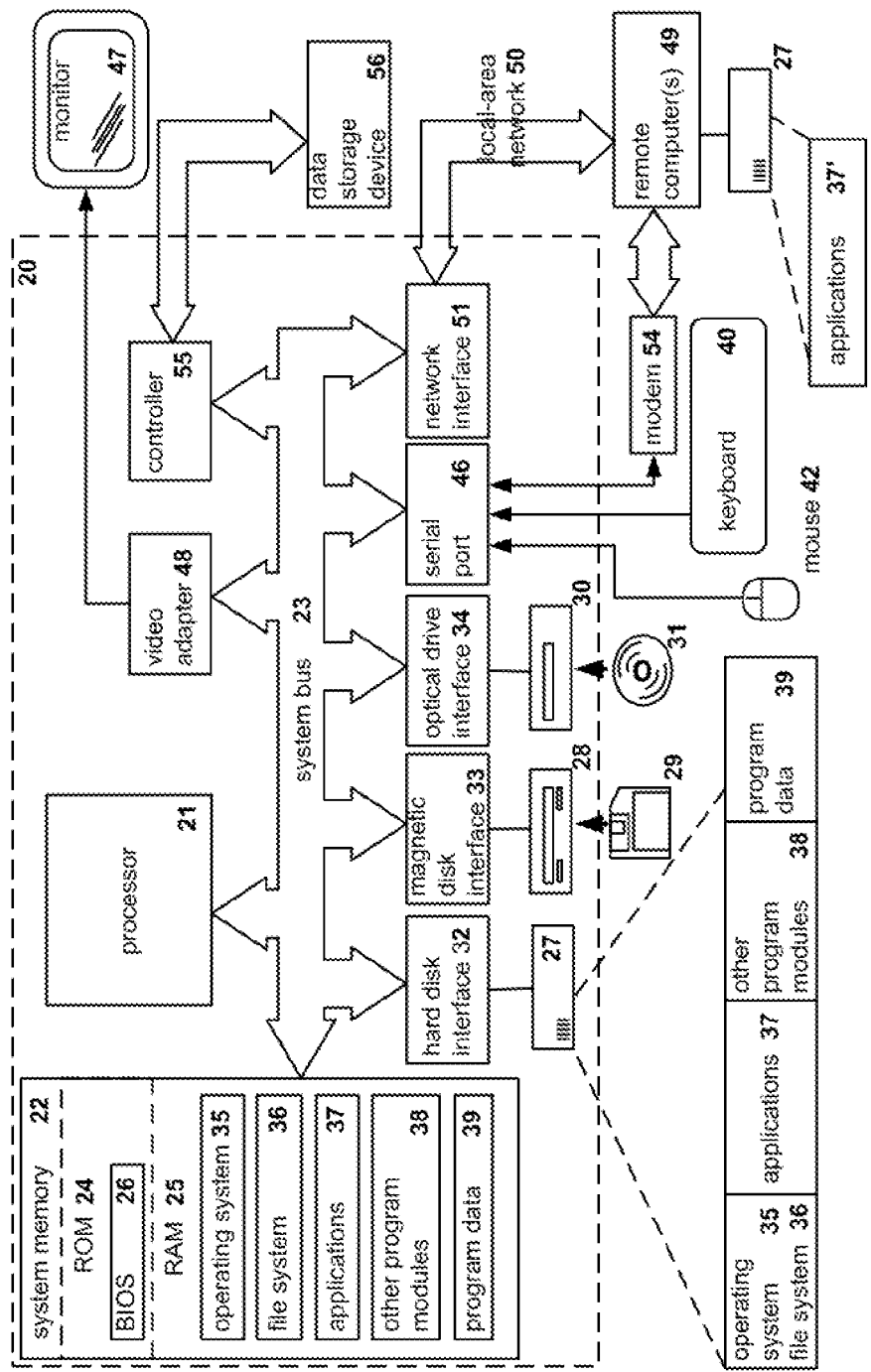
FIG. 12 illustrates a block diagram of a general-purpose computer system on which the disclosed system and method can be implemented according to an exemplary aspect.

FIG. 12 illustrates a block diagram of a general-purpose computer system on which the disclosed system and method can be implemented according to an exemplary aspect. It should be noted that the computer system 20 can correspond to the computer system 150 of FIG. 1B or system 200 of FIG. 2, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A system for executing, on a first operating system (OS), components native to a second operating system (OS), the system comprising:
    one or more processors; and
    memory, coupled to the one or more processors, storing thereon:
        a first OS kernel that is executing on the one or more processors:
            receives from a subsystem of the second OS a system call to access a second OS kernel function; and
            retransmits the system call to one or more drivers native to the first OS; and
        the subsystem of the second OS, comprising:
            one or more user space components native to the second OS that are executing natively in a non-privileged mode of the one or more processors;
            one or more drivers associated with the second OS that are executing in the non-privileged mode of the one or more processors;
            one or more support components that:
                are executing in the non-privileged mode of the one or more processors; and
                comprise and provide, to the one or more drivers associated with the second OS and to the one or more drivers native to the first OS, high-level functionality of the second OS kernel, wherein the high-level functionality is defined as a functionality without direct access to hardware, privileged instructions and privileged system data, and wherein the high-level functionality includes high-level logic of at least one of: one or more second OS kernel subsystems and one or more second OS kernel exported functions; and
        the one or more drivers native to the first OS that:
            are executing in a privileged mode of the one or more processors;
            receive the system call; and
            process the system call using control transfer to the support components.

2. The system of claim 1, wherein the one or more drivers associated with the second OS kernel and the one or more support components execute in a memory range that is protected from the one or more user space components.

3. The system of claim 2, wherein the gap memory is the protected memory range and
    wherein the first OS kernel assigns the gap memory to be accessible in non-privileged mode by modifying a memory map of the first OS, wherein the gap memory is a range of memory addresses that were previously accessible only in privileged mode.

4. The system of claim 3, wherein the gap memory comprises several conjoint or non-conjoint memory address ranges.

5. The system of claim 3, wherein the one or more drivers of the first OS, supporting the subsystem, performs at least one of the following actions, depending on the received system call:
    (a) calling one of the components of the second OS subsystem, which are in a privileged mode of the one or more processors; or
    (b) translating the system call to a call to an API of the first OS kernel; and calling the first OS kernel.

6. The system of claim 3,
    wherein the one or more user space components of the second OS are executed in a first process, and the one or more drivers associated with the second OS and the one or more support components are executed in a second process, and
    wherein a context switch between the one or more user space components of the second OS and the one or more drivers and the one or more support components associated with the second OS comprises switching between the first process and the second process.

7. The system of claim 1, wherein the one or more drivers associated with the second OS execute in the non-privileged mode and the supporting components execute in the non-privileged mode.

8. The system of claim 7, wherein the one or more drivers associated with the second OS call one or more second OS API functions from the one or more supporting components.

9. The system of claim 7, wherein protection of the memory range from the one or more user space components further comprises that the memory range is inaccessible in a process, when the process is executing any of the one or more user space components.

10. The system of claim 1, wherein a one or more drivers associated with the second OS are executing in the non-privileged mode by modifying a portion of the one or more drivers, and wherein the one or more drivers send system calls to kernel mode components.

11. The system of claim 1, wherein the one or more user space components are applications native to the second OS.

12. The system of claim 1, wherein the one or more drivers of the first OS, supporting the subsystem, process the system call by:
   translating the system call to the API call of the first OS; and
   invoking the API call.

13. A method for executing, on a first operating system (OS), components native to a second operating system (OS), the method comprising:
   receiving, by a first OS kernel that is executing on one or more processors of the first OS, from a subsystem of the second OS a system call to access a second OS kernel function; and
   retransmitting the system call to one or more drivers native to the first OS,
   wherein the subsystem of the second OS, comprises:
      one or more user space components native to the second OS that are executing natively in a non-privileged mode of the one or more processors,
      one or more drivers associated with the second OS that are executing in the non-privileged mode of the one or more processors,
      one or more support components that are executing in the non-privileged mode of the one or more processors, and
      comprising and providing, to the one or more drivers associated with the second OS and to the one or more drivers native to the first OS, high-level functionality of the second OS kernel, wherein the high-level functionality is defined as a functionality without direct access to hardware, privileged instructions and privileged system data, and wherein the high-level functionality includes high-level logic of at least one of: one or more second OS kernel subsystems and one or more second OS kernel exported functions, and
   wherein the one or more drivers native to the first OS that are executing in a privileged mode of the one or more processor, receive the system call, and process the system call using control transfer to the support components.

14. The method of claim 13, wherein the one or more drivers associated with the second OS kernel and the one or more support components execute in a memory range that is protected from the one or more user space components.

15. The method of claim 13, wherein the one or more drivers associated with the second OS execute in the non-privileged mode and the supporting components execute in the non-privileged mode.

16. The method of claim 15, wherein the one or more drivers associated with the second OS call one or more second OS API functions from the one or more supporting components.

17. The method of claim 15, wherein protection of the memory range from the one or more user space components further comprises that the memory range is inaccessible in a process, when the process is executing any of the one or more user space components.

18. The method of claim 13, wherein a one or more drivers associated with the second OS are executing in the non-privileged mode by modifying a portion of the one or more drivers, and wherein the one or more drivers send system calls to kernel mode components.

19. The method of claim 13, wherein the one or more user space components are applications native to the second OS.

20. A non-transitory computer-readable medium storing thereon instructions that when executed perform a method for executing, on a first OS, components native to a second OS, the method comprising:
   receiving, by a first OS kernel that is executing on one or more processors of the first OS, from a subsystem of the second OS a system call to access a second OS kernel function; and
   retransmitting the system call to one or more drivers native to the first OS,
   wherein the subsystem of the second OS, comprises:
      one or more user space components native to the second OS that are executing natively in a non-privileged mode of the one or more processors,
      one or more drivers associated with the second OS that are executing in the non-privileged mode of the one or more processors,
      one or more support components that are executing in the non-privileged mode of the one or more processors, and
      comprising and providing, to the one or more drivers associated with the second OS and to the one or more drivers native to the first OS, high-level functionality of the second OS kernel, wherein the high-level functionality is defined as a functionality without direct access to hardware, privileged instructions and privileged system data, and wherein the high-level functionality includes high-level logic of at least one of: one or more second OS kernel subsystems and one or more second OS kernel exported functions, and
   wherein the one or more drivers native to the first OS that are executing in a privileged mode of the one or more processor, receive the system call, and process the system call using control transfer to the support components.

* * * * *